United States Patent [19]
Richard

[11] 3,854,333
[45] Dec. 17, 1974

[54] METHOD FOR DETERMINING DIRECTION AND SPEED OF OCEAN CURRENTS

[76] Inventor: Joseph D. Richard, 3613 Loquat Ave., Miami, Fla. 33133

[22] Filed: Apr. 25, 1973

[21] Appl. No.: 354,368

[52] U.S. Cl. ................................. 73/170 A, 73/189
[51] Int. Cl. ............................................ G01d 1/00
[58] Field of Search ................... 73/170 A, 189, 181

[56] References Cited
UNITED STATES PATENTS
| | | | |
|---|---|---|---|
| 1,850,978 | 3/1932 | Sperry | 73/189 |
| 2,202,987 | 6/1940 | Egenas | 73/189 |
| 3,344,665 | 10/1967 | Anthony | 73/181 |

Primary Examiner—Richard C. Queisser
Assistant Examiner—Anthony V. Ciarlante

[57] ABSTRACT

A method for measuring from a moving vessel the speed and direction of ocean currents relative to the earth's surface. A turning maneuver of the measuring vessel within an ocean current results in acceleration changes which are measured and recorded. The vessel's heading and turn rate are also recorded along with a time base. From the recorded information, current direction is determined from the vessel's heading which coincides with a null in the measured acceleration. Current speed is determined from the magnitude of the acceleration signal and the turn rate.

8 Claims, 12 Drawing Figures

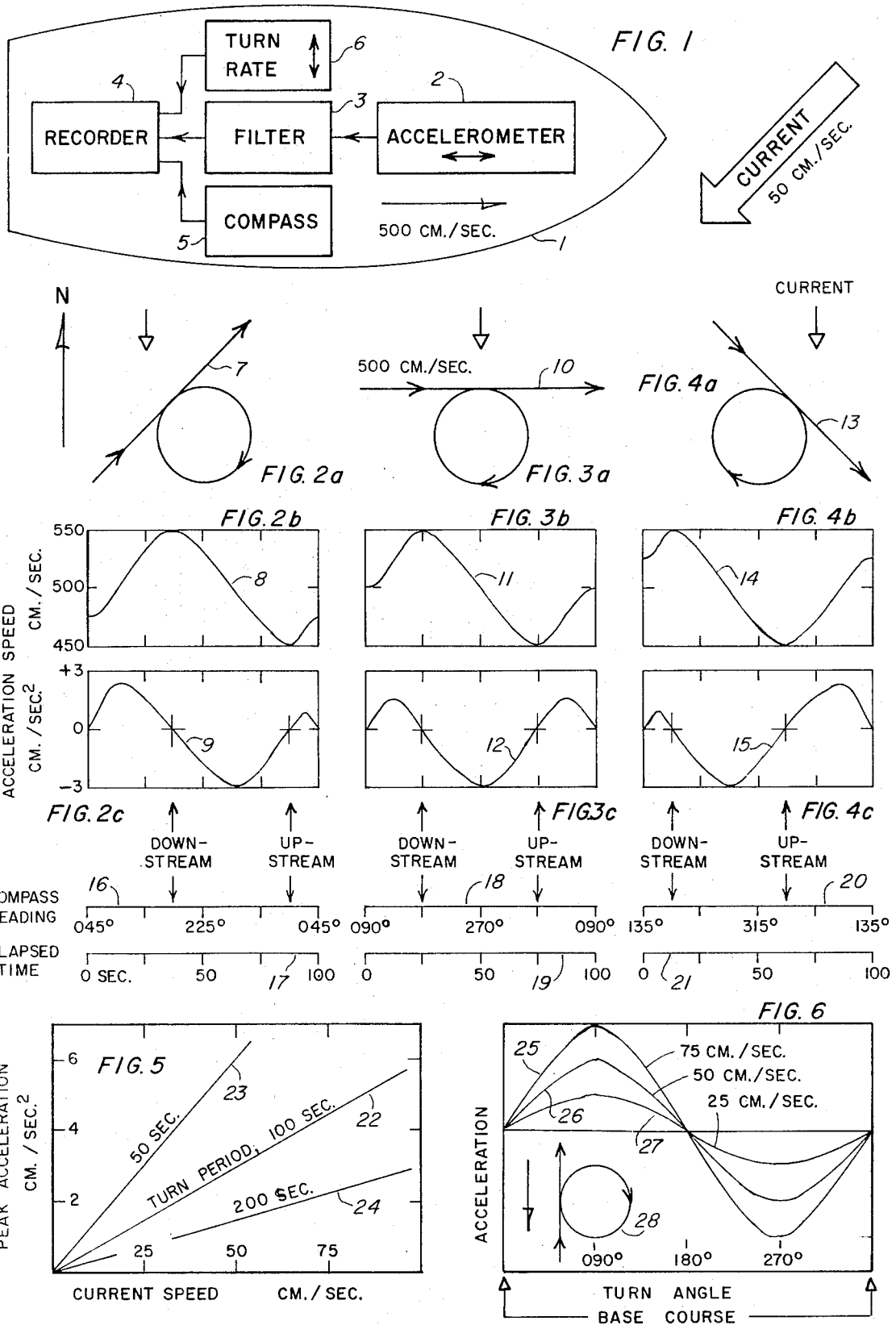

METHOD FOR DETERMINING DIRECTION AND SPEED OF OCEAN CURRENTS

BACKGROUND OF THE INVENTION

In the past, a variety of methods have been used for measuring ocean currents. Generally, some type of rotor is employed along with a method for indicating or recording the rotation rate, or the accumulated rotation count, of the rotor either periodically or continuously as a function of time. As the earth's surface is considered the fixed reference by which currents are measured, a common characteristic of almost all current meters is that they must be attached somehow to the ocean bottom. One exception to this has been the electromagnetic current meter which measures the electric potential induced across the current flow relative to the vertical component of the earth's magnetic field. However, one serious disadvantage of the electromagnetic current meter is the need for deploying a pair of widely spaced electrodes some considerable distance astern of the ship. It has been desirable, therefore, that a method be devised for measuring ocean currents which is devoid of the various limitations inherent in instrumented moorings or towed electrode arrays.

SUMMARY OF THE INVENTION

The present invention provides a method for measuring the direction and speed of ocean currents from a moving ship without the deployment of external instrumentation or electrodes. Although a ship on a constant course is not accelerated by a steady current, small horizontal accelerations relative to the earth's surface are experienced along the axis of the ship when it is turned within such currents. Such accelerations change continuously during a turn maneuver and the peak acceleration is proportional to both turn rate and current speed. When the turn rate is known or measured, the current speed can be calculated from either the measured peak or integrated acceleration. Current direction is determined from the ship's heading which coincides with a null in the acceleration signal. While turning the transition from positive to negative acceleration coincides with a downstream heading, and the transition from negative to positive acceleration coincides with an upstream heading. In the present invention, at least one accelerometer is used to selectively measure, as a function of time and direction, the slowly changing acceleration forces along the axis of the ship as it is turned through a predetermined maneuver, for example, a 360° turn at relatively high angular velocity.

For purposes of the present invention, it is preferred to measure the tangential component of the angular acceleration during the turn maneuver with an accelerometer aligned parallel to the ship's axis. However, as an alternative, the radial (or centripal) component of the angular acceleration could be measured using a horizontally mounted accelerometer aligned normal to the ship's axis. When the acceleration signal, time, and ship's heading are simultaneously measured and recorded during a suitable turn maneuver, the current direction and speed can be determined from the graphic record or other data storage means. Turn rate can be measured directly by conventional means, by a separate accelerometer which measures the radial component of the angular acceleration, or, alternatively can be derived from a recording of ship's heading as a function of time.

DESCRIPTION OF THE DRAWINGS

FIG. 1 is a schematic view of a ship instrumented according to the present invention.

FIGS. 2a–2c show speed changes and resulting accelerations recorded during a 360° turn maneuver in a southerly current when the base compass course is 045°.

FIGS. 3a–3c show speed changes and resulting accelerations recorded during a 360° turn maneuver in a southerly current when the base compass course is 090°.

FIGS. 4a–4c show speed changes and resulting accelerations recorded during a 360° turn maneuver in a southerly current when the base compass course is 135°.

FIG. 5 shows the relationship between current speed and peak acceleration for three turn periods.

FIG. 6 shows the change in acceleration resulting from a 360° turn for three current speeds when the base course is directly upstream.

DESCRIPTION OF THE PREFERRED EMBODIMENT

Referring to FIG. 1, and instrumented vessel 1 having a sensitive low frequency accelerometer 2 aligned parallel to its major axis. In a preferred embodiment, the accelerometer 2 is gyro stabilized. In the schematic view, the speed of the ship through the water is 500 cm/sec and a 50 cm/sec current is setting off the starboard quarter. A filter 3 passes only the low frequency components from the output of the accelerometer 2. For example, if the 360° turn period for the ship is normally 100 seconds, the filter 3 could be set to pass only those frequencies within the band 0.005 Hz to 0.05 Hz thereby excluding the higher frequency acceleration signals caused by wave slamming during the turn maneuver. The low frequency signal components from the accelerometer 2 are graphically recorded, along with the output from the turn rate indicator 6 and the compass 5, by the graphic recorder 4. A conventional time base is included in the recorder 4 so that elapsed time can be determined for all of the recorded information.

FIG. 2a shows the track 7 of the ship 1 after a 360° turn from a base compass course of 045° in a southerly current. FIG. 2b shows the changing forward speed 8 of the ship 1, relative to the earth's surface while turning through the 360° turn maneuver of FIG. 2a. The speed of the ship need not be measured. FIG. 2c shows the measured changing acceleration 9 recorded during the turn maneuver. Corresponding compass headings 16 and elapsed time 17 are shown for the period of the turn maneuver. A downstream heading is indicated at 180° when the acceleration signal passes zero going from positive to negative. An upstream heading is indicated at 360° when the acceleration signal passes zero going from negative to positive. A peak in the acceleration signal (estimated about −3 cm/sec$^2$) occurs while passing through a compass heading of 270°. When either the rate of turn or the turn period is measured (or otherwise determined from the compass-time record) the current speed can be determined from the measured peak acceleration or from some integrated value of the positive or negative acceleration. In FIG. 2 a current speed of about 50 cm/sec setting to the south (180°) is indicated by the graphically recorded information. FIG. 5 shows the relationship between peak acceleration and current speed for the 100 second turn period.

FIG. 3a shows the track 10 of the ship 1 after a 360° turn from a base course of 090° in a southerly current. FIG. 3b shows the changing forward speed 11 of the ship 1 relative to the earth's surface, while turning through the 360° turn maneuver of FIG. 3a. FIG. 3c shows the measured changing acceleration 12 recorded during the turning maneuver. Corresponding compass headings 18 and elapsed time 19 are shown for the period of the turn maneuver. Downstream and upstream headings occur when the acceleration signal crosses zero and a current direction of 180° is indicated as in FIG. 2. Similarly, a current speed of about 50 cm/sec is indicated for the measured peak acceleration (actually a deceleration) which occurs on a heading of 270°.

FIG. 4a shows the track 13 of the ship 1 after a 360° turn from a base compass course of 135° in a southerly current. FIG. 4b shows the changing forward speed 14 of the ship 1, relative to the earth's surface, while turning through the 360° turn maneuver of FIG. 4a. FIG. 4c shows the measured changing acceleration 15 recorded during the turn maneuver. Corresponding compass headings 20 and elapsed time 21 are shown for the period of the turn maneuver. Downstream and upstream headings occur when the acceleration signal crosses zero, and a current direction of 180° is indicated as in FIGS. 2 and 3. Similarly, a current speed of about 50 cm/sec is indicated by the measured peak acceleration (or deceleration) which occurs at a heading of 270°.

From FIGS. 2, 3, and 4 it can be seen that current direction and speed can be determined from the recorded information regardless of the base course of the ship.

FIG. 5 shows the relationships 22, 23, and 24 between current speed and peak acceleration for three different turn periods. For a particular current speed, the peak acceleration is increased when the turn period is decreased (i.e., the turn rate increased). For example, for a current speed of 50 cm/sec the peak accelerations are about 6, 3, and 1.5 cm/sec$^2$ for turn periods of 50, 100, and 200seconds respectively.

FIG. 6 shows how peak acceleration increases with increasing current speed for a particular turn period. For example, the acceleration signal is doubled when the current speed is increased from 25 cm/sec to 50 cm/sec. A symmetrical and almost sinusoidal acceleration signal results, as in FIG. 6, whenever the base course coincides with either an upstream or downstream heading. It may be seen that current speed is also proportional to the total area under the combined positive and negative portions of the acceleration signal. Thus a pulse count method can be used to obtain total acceleration, proportional to current speed, when a digital output accelerometer is used.

A method has been described for determining ocean current speed and direction from a moving ship. The horizontally positioned accelerometer is aligned parallel with the ship's axis and, because of its high sensitivity, is affected by gravity whenever pitching motions occur. Whenever the unwanted accelromter output signals are substantially different in frequency from the current induced accelerations, they may be filtered out electronically by means of a band-pass or low-pass filter. As a preferred alternative, however, the accelerometer can be mounted on a gyroscopically stabilized platform. As a second alternative, the accelerometer can be rigidly fixed to the ship and separate pitch and roll sensors used to provide compensation for the various motions.

For simplicity, it is assumed that the propulsion system of the ship is maintained at substantially constant thrust during the turning maneuver described. In practice, however, even at constant thrust the forward speed relative to the water would decrease in proportion to the turn rate due to the skidding effect and increased drag. For a standardized turn maneuver and initial forward speed relative to the water, at constant thrust, each ship would have a characteristic decrease in speed (relative to the water) depending on its mass, shape, and variation in turn rate. This forward speed change relative to the water during a standard turn maneuver can be determined for a particular ship by means of a conventional forward speed indicator and compensated for in the computation of current speed based on the measured accelerations. Alternatively, the forward speed of the ship relative to the water can be maintained substantially constant during the turn maneuver by continuously adjusting the thrust.

Although a decrease in forward speed relative to the water occurs at the initiation of the turn maneuver, thereafter, when the rate of turn is held constant there is no change of forward speed relative to the water. Therefore, for a particular ship at substantially constant thrust and turn rate, the measured accelerations along the axis are attributable directly to the effects of current speed and direction and the above mentioned compensation for variations in ship speed relative to the water become unnecessary in the calculation of current speed.

As an alternative to the graphic recording of the measured variables, the information can be fed directly into a specialized computer for the determination of current speed and direction. In this way, the turn characteristics of a particular ship can be conveniently entered into the computation.

Turn rate can be determined from the compass heading and elapsed time record when they are recorded along with the accelerometer signal. Alternatively, turn rate can be measured with a commercially available turn rate indicator. For example, turn rate information can be provided by the integrated output from an angular accelerometer. Although angular acceleration could be measured directly for purposes of the present invention, it is more convenient to measure the tangential component with a linear accelerometer, and separately determine turn rate.

Although a 360° turn is shown as a suitable turn maneuver, less extensive turns could also be used. To determine current direction, the turn need only continue until a null occurs in the accelerometer signal to indicate either an upstream or downstream orientation. To determine current speed, the turn need only continue until a maxima occurs in the acceleration signal, and this happens when the ship's heading is at right angle to the current direction.

While only a single embodiment is shown and described herein, it is understood that many modifications are possible and the invention is not limited to the

What is claimed is:

1. The method for measuring the speed and direction of an ocean current from a moving powered vessel comprising: measuring horizontal accelerations along at least one axis of the aforementioned powered vessel during a turning maneuver; while substantially maintaining a constant speed of the vessel relative to the water measuring the rate of turn of the aforementioned powered vessel during the said turning maneuver; indicating the compass heading of the aforementioned powered vessel during the said turning maneuver; computing the speed of the aforementioned ocean current from the said measured accelerations and turning rate; and determining the direction of the aforementioned ocean current by indicating the compass heading which coincides with a null in the said measured acceleration.

2. The method described in claim 1 wherein the accelerometer output, turn rate information, and compass heading are simultaneously recorded as functions of elapsed time.

3. The method described in claim 1 wherein the accelerometer output is filtered to selectively pass a sinusoidal signal having a period corresponding to the 360° turn period of the aforementioned powered vessel.

4. The method described in claim 1 wherein the accelerometer is gyro stabilized to eliminate pitch and roll effects from the aforementioned powered vessel.

5. The method described in claim 1 wherein the accelerometer output is electronically compensated by pitch and roll sensors to remove motional effects from the aforementioned powered vessel.

6. The method of determining the direction of an ocean current from a moving powered vessel comprising: changing the course of the aforementioned powered vessel until either an upstream or downstream heading is passed while substantially maintaining a constant speed of the vessel relative to the water; measuring the horizontal acceleration along the axis of the aforementioned powered vessel during the said course change; and indicating the compass heading of the aforementioned powered vessel coinciding with a null in the said measured acceleration, the direction of the aforementioned ocean current being thereby determined.

7. The method of measuring the speed of an ocean current from a moving powered vessel comprising: changing the course of the aforementioned powered vessel until both upstream and downstream headings are passed, while substantially maintaining a constant speed of the vessel relative to the water, measuring the changing horizontal accelerations along at least one axis of the aforementioned powered vessel during the said course change;

measuring the rate of turn of the aforementioned powered vessel during the said course change; and computing the speed of the aforementioned ocean current as a function of the measured accelerations and turn rate.

8. The method described in claim 7 wherein the said course change consists of a complete 360° turn.

* * * * *